United States Patent [19]

Amano et al.

[11] Patent Number: 4,577,455
[45] Date of Patent: Mar. 25, 1986

[54] GRASS CUTTING HEIGHT INDICATOR FOR LAWN MOWER AND TRACTOR COMBINATION

[75] Inventors: Akira Amano, Tokyo; Kazuhiko Sasaki, Saitama, both of Japan

[73] Assignee: Honda Giken Kogyo Kabushiki Kaisha, Tokyo, Japan

[21] Appl. No.: 676,907

[22] Filed: Nov. 30, 1984

[30] Foreign Application Priority Data

Nov. 30, 1983 [JP] Japan ................... 58-184750

[51] Int. Cl.4 ............................................. A01D 34/54
[52] U.S. Cl. ................................ 56/17.1; 56/DIG. 22; 56/255
[58] Field of Search .................. 56/17.1, 17.2, 255, 56/DIG. 22, 320.2

[56] References Cited

U.S. PATENT DOCUMENTS

| | | | |
|---|---|---|---|
| 2,776,844 | 1/1957 | Wilkin | 56/17.2 |
| 2,926,926 | 3/1960 | Rowe et al. | 56/17.2 |
| 3,063,226 | 11/1962 | Pfauser | 56/DIG. 22 |
| 3,234,719 | 2/1966 | Rank | 56/254 |
| 3,245,209 | 4/1966 | Marek | 56/254 |
| 3,283,486 | 11/1966 | Marek et al. | 56/DIG. 22 |
| 4,006,580 | 2/1977 | Kalleicher | 56/17.2 |

FOREIGN PATENT DOCUMENTS

| | | | |
|---|---|---|---|
| 253212 | 2/1963 | Australia | 56/17.1 |
| 2328599 | 1/1975 | Fed. Rep. of Germany | 56/17.2 |

Primary Examiner—Robert P. Swiatek
Assistant Examiner—David L. Tarnoff
Attorney, Agent, or Firm—Armstrong, Nikaido, Marmelstein & Kubovcik

[57] ABSTRACT

A grass cutting height indicator in a combination of a lawn mower and a power-driven tractor having an operator's seat, including a lawn mower unit suspended from a tractor frame of the tractor, an adjusting lever disposed adjacent to the operator's seat, and a link mechanism operatively connected between the adjusting lever and the lawn mower unit for adjusting the height of the lawn mower unit above ground in response to operation of the adjusting lever. The indicator comprises an indicator member mounted on the link mechanism and having indicia for indicating grass cutting heights, and an indicator window defined in a tractor body adjacent to the operator's seat, the indicator member being positioned so that the indicia has at least a portion thereof facing the indicator window.

5 Claims, 4 Drawing Figures

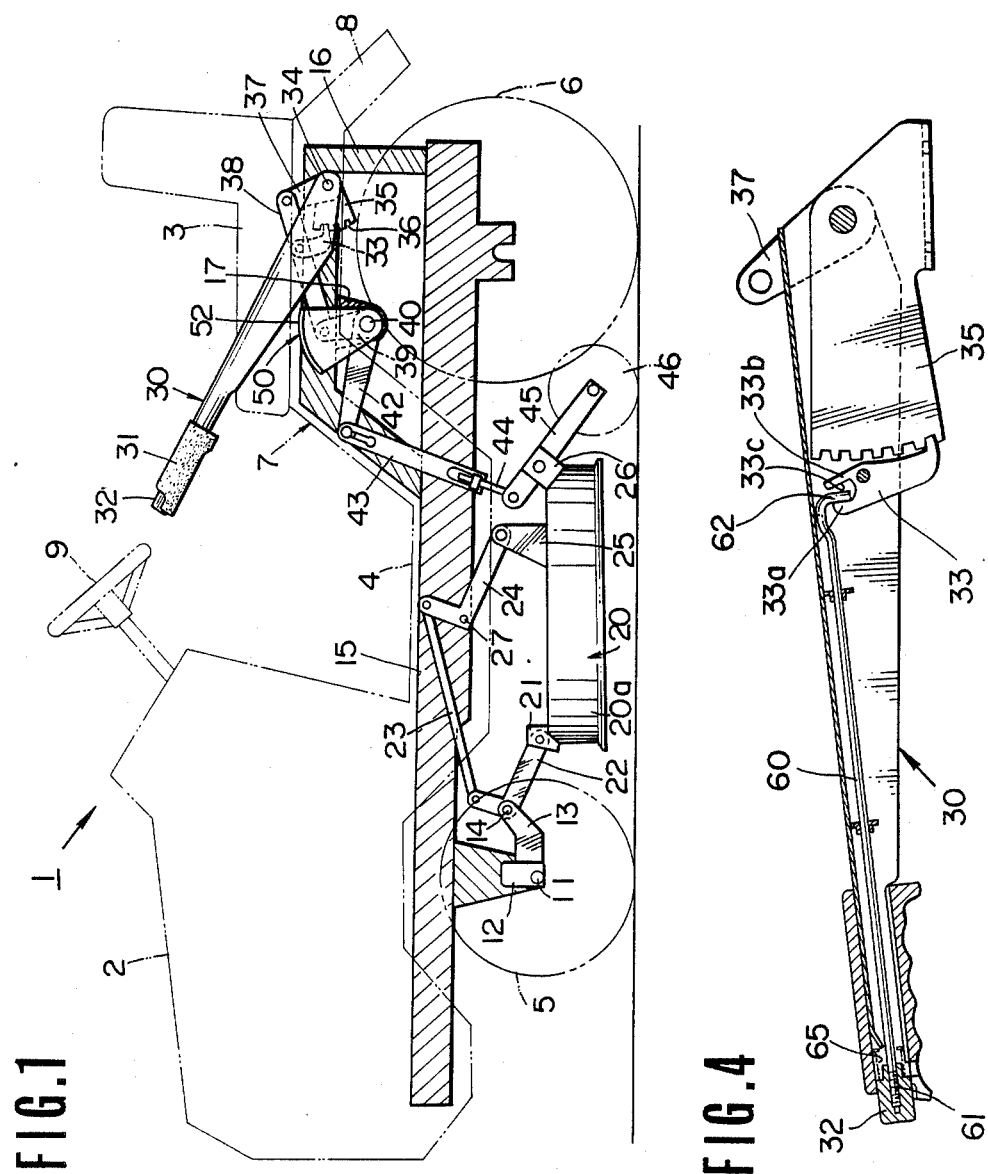

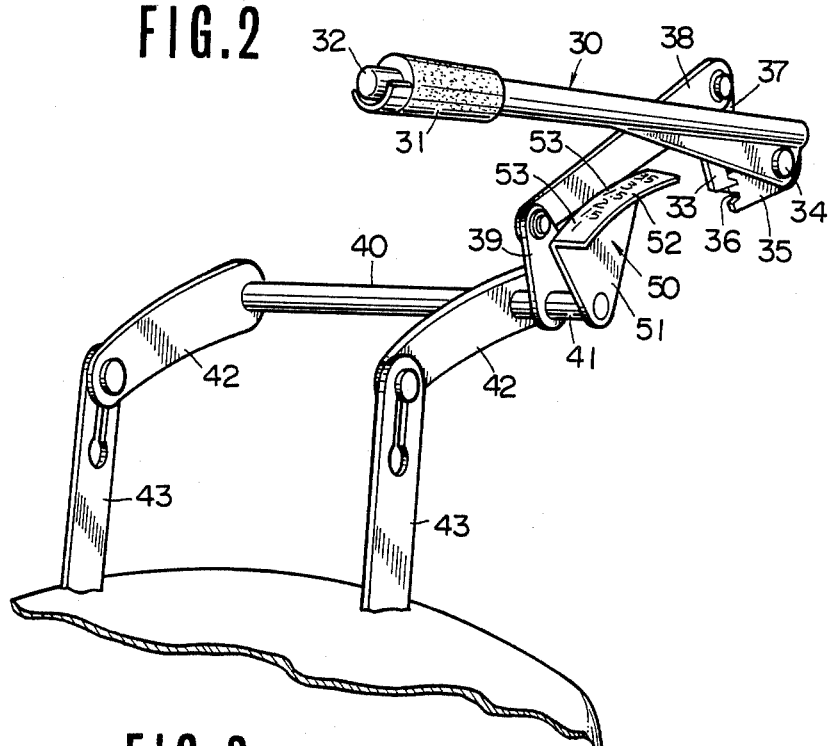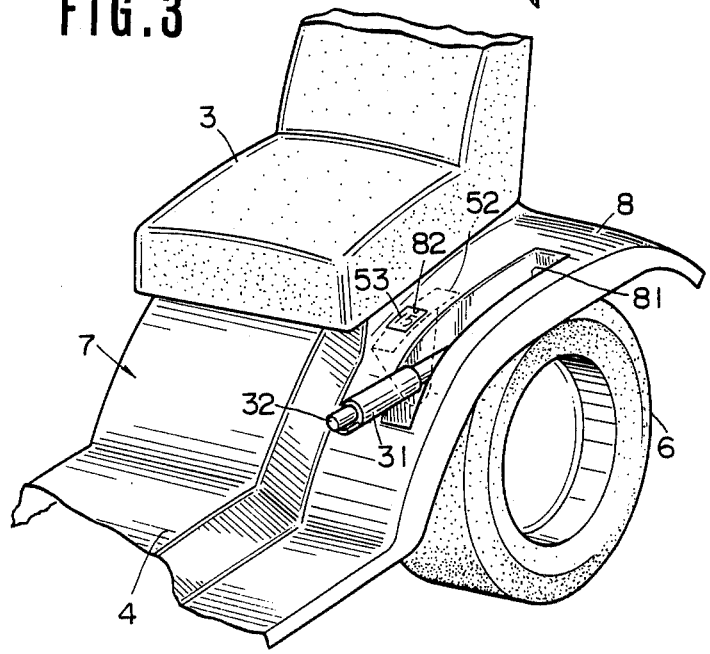

GRASS CUTTING HEIGHT INDICATOR FOR LAWN MOWER AND TRACTOR COMBINATION

BACKGROUND OF THE INVENTION

1. Field of the invention

The present invention relates to a grass cutting height indicator in a lawn mower and tractor combination or a riding lawn mower in which a lawn mower unit is suspended underneath a tractor.

2. Description of the Prior Art

There are known grass cutting height adjusting devices, as disclosed in U.S. Pat. Nos. 3,234,719 and 3,245,209, in which a single adjustment lever located adjacent to an operator's station or seat is operatively coupled by a link mechanism to a lawn mower unit suspended underneath the vehicle body of a tractor for varying the height of the lawn mower unit above ground. The known adjusting devices are advantageous in that they can be operated with ease since a desired grass cutting height can be adjusted with the single adjustment lever. However, an adjusted grass cutting height cannot easily be confirmed accurately since it is confirmed primarily based on experience and skill of the operator to check how the adjustment lever is inclined.

SUMMARY OF THE INVENTION

With the foregoing problem in view, it is an object of the present invention to provide a grass cutting height indicator in a lawn mower and tractor combination for enabling the operator while sitting on the operator's seat to confirm a grass cutting height with ease simply by looking down at an indicator panel near a grass cutting height adjusting lever.

According to the present invention, there is provided a grass cutting height indicator in a power-driven tractor having an operator's seat, comprising a lawn mower unit suspended from a tractor frame of the tractor, an adjusting lever disposed adjacent to the operator's seat, a link mechanism operatively connected between the adjusting lever and the lawn mower unit for adjusting the height of the lawn mower unit above ground in response to operation of the adjusting lever, an indicator member mounted on the link mechanism and having indicator means for indicating grass cutting heights, and an indicator window defined in a tractor body adjacent to the operator's seat, the indicator member being positioned so that the indicator means has at least a portion thereof facing the indicator window.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic side elevational view of a grass cutting height adjusting device to which the present invention is applicable, with a tractor shown in imaginary lines;

FIG. 2 is an enlarged perspective view of a mechanism of a grass cutting height indicator according to the present invention;

FIG. 3 is a fragmentary perspective view of the tractor with the grass cutting height indicator, showing an operator's seat and an adjacent area; and FIG. 4 is a cross-sectional view of an adjusting lever.

DESCRIPTION OF THE PREFERRED EMBODIMENT

FIG. 1 shows a lawn mower and tractor combination or a riding lawn mower including a tractor 1 indicated by the imaginary lines. The tractor 1 has an engine (not shown) mounted on a front portion of a tractor body and covered with an engine cover 2. An operator's station or seat 3 is mounted on a rear portion of the tractor body, with a floor 4 extending forwardly from the seat 3. A pair of steerable front wheels 5, 5 is rotatably mounted on the front portion of the tractor body, and a pair of drive rear wheels 6, 6 is mounted on the rear portion of the tractor body. A pair of rear fenders 8 (only one shown) is integral with a body cover 7 and extends laterally from a cover portion beneath the seat 3 in overhanging relation to the rear wheels 6. A steering wheel 9 is rotatably mounted on the tractor body and operatively coupled to the front wheels 5, 5 for steering them.

A lawn mower unit 20 is suspended from the floor 4 through a link mechanism and includes a housing 20a accommodating therein a number of mower blades mounted on a vertical shaft for rotation in a horizontal plane. The vertical shaft is rotated by a belt-and-pulley mechanism operatively connected to a mower output shaft of the engine.

A bell crank arm 22 is pivotably mounted at one end on a bracket 21 mounted on an upper front edge of the housing 20a of the lawn mower unit 20. The bell crank arm 22 has an intermediate angular portion pivotably supported by a pin 14 on a bracket 13 extending rearwardly from a frame 12 on which a front wheel axle 11 is journalled. The bell crank arm 22 has an opposite end to which there is pivotably attached a front end of a rod 23 with its rear end pivotably attached to an end of a bell crank arm 24. The other end of the bell crank arm 24 is pivotably mounted on a bracket 25 mounted on the housing 20a near a rear end thereof. The bell crank arm 24 has an intermediate angular portion pivotably supported by a pin 27 on a main frame 15 below the floor 4. The above-described parallel link mechanism is provided in each of laterally spaced positions below the tractor body.

An adjusting lever 30 which is inclined forwardly is positioned on one side of the operator's seat 3. The adjusting lever 30 comprises a pipe mounted on a subframe 16 below the seat 3 for vertical angular movement. The adjusting lever 30 has an integral support shaft 34 to which there is fixed an arm 37 ("second arm") having its distal end directed forwardly and upwardly. A sector gear 35 with its teeth 36 directed forwardly is supported at its center bearing on the support shaft 34 in fixed relation to the subframe 16. As illustrated in FIG. 3, the adjusting lever 30 includes a grip 31 projecting out of a slot 81 defined in one of the rear fenders 8, and including a resiliently-biased push knob 32 disposed in a distal end of the grip 31 and operatively coupled to a pawl 33 pivotably disposed in a lower portion of the lever 30. The pawl 33 is normally held in meshing engagement with the teeth 36 of the sector gear 35. When the push knob 32 is pushed in, the pawl 33 is caused to swing forwardly and be released out of mesh with the teeth 36.

As clearly shown in FIG. 4, the adjusting lever 30 has a rod 60 extending axially therein with the push knob 32 coupled to an end 61 of the rod 60. The rod 60 is thus axially movable with the push knob 32. The rod 60 has an opposite end 62 bent laterally into engagement with the pawl 33. The pawl 33 has a bifurcated end composed of legs 33a, 33b spaced from each other by a recess 33c in which the end 62 of the rod 60 is disposed normally in engagement with the leg 33a, so that the pawl 33 is biased into meshing engagement with the sector-shaped gear 35 under the force of a spring 65 disposed in the lever 30 below the push knob 32. When the push knob 32 is depressed, the end 62 of the rod 60 pushes the leg 33b of the pawl 33 to turn the latter out of meshing engagement with the sector-shaped gear 35.

A link 38 is pivotably connected at a rear end to a distal end of the arm 37 and at a front end to an upper end of an arm 39 extending parallel to the arm 37 and having a lower end pivotably supported on a stay 17 fixed to the subframe 16 by a first support shaft 40 which is secured to the arm 39 and which extends transversely of the tractor body. To the first support shaft 40, there is secured a pair of arms 42 with their distal ends directed forwardly. To the distal ends of the arms 42, there are pivotably coupled links 43 having lower ends pivotably connected by joint rods 44 to upper ends of arms 45 (only one shown in FIG. 1), respectively.

The arms 45 have intermediate portions pivotably mounted on brackets 26 mounted on the rear end of the housing 20a of the lawn mower unit 20. The arms 45 are inclined forwardly and upwardly, and support on their lower ends a pair of ground-contacting wheels 46 (only one shown in FIG. 1).

In operation, the ground-contacting wheels 46 are held in contact with ground while cutting grass. The operator while sitting on the seat 3 manipulates the adjusting lever 30 to bring the pawl 33 into mesh with different teeth 35 thereby causing the link mechanism operatively coupled to the lever 30 to vary the height of the rear end of the lawn mower unit 20 as the arms 45 turn about the wheels 46. At this time, the lawn mower unit 20 is vertically and obliquely moved while being kept substantially horizontally through the parallel link mechanism 21, 22, 23, 24, 25, and then set to a desired height from the ground. The lawn mower unit 20 has its front end slightly lower than the rear end, but is substantially horizontal since it is inclined at about 0.5° to the ground.

Therefore, grass can be cut off at desired cutting heights by the mower blades disposed in the housing 20a and rotating horizontally.

One component of the link mechanism constituting the grass cutting height adjusting device, that is, the support shaft 40 extending transversely of the tractor body has an axial extension 41 projecting below the adjusting lever 30 and supporting an indicator member 50 secured thereto.

As shown in FIG. 2, the indicator member 50 comprises a substantially vertical sector-shaped base plate 51 and an arcuate indicator panel 52 extending laterally along an outer arcuate edge of the sector-shaped base plate 51. The sector-shaped base plate 51 has a lower center bearing secured to the axial extension 41 of the first support shaft 40. The indicator panel 52 is disposed below and near a lower surface of the rear fender 8 on one side of the operator's seat 3. The indicator panel 52 bears numerals or symbols 53 representing different grass cutting heights and corresponding to positions in which the pawl 33 meshes with the sector gear 35, the numerals or symbols 53 being graduated at intervals ranging from 0.5 (cm) to 1.0 (cm).

The rear fender 8 below which the indicator panel 52 is disposed has an indicator window 82 for the operator to see one at a time of the numerals or symbols representing different grass cutting heights.

With the arrangement of the present invention, as described above, the indicator member 50 actuatable in unison with the link mechanism is disposed in the vicinity of the adjusting lever 30 located on one side of the operator's seat 3, and the rear fender 8 has the indicator window 82 for the operator to see the indicator panel 52. Therefore, the operator while sitting on the seat 3 can easily confirm a grass cutting height simply by viewing the indicator panel 52 near the adjusting lever 30.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A grass cutting height indicator in a power-driven tractor having an operator's seat, comprising:
   (a) a lawn mower unit suspended from a tractor frame of said tractor;
   (b) an adjusting lever disposed to be pivotably supported on said tractor frame below and to the rear of said operator's seat;
   (c) a link mechanism operatively connected between said adjusting lever and said lawn mower unit for adjusting the height of said lawn mower above ground in response to operation of said adjusting lever said link mechanism including a first arm pivotably supported by a first support shaft on said tractor frame and a second arm mounted on a second support shaft for angular movement with said adjusting lever and operatively coupled to said first arm in substantially parallel relation thereto;
   (d) an indicator member for indicating grass cutting heights comprising a sector-shaped plate having a center bearing fixedly supported on said first support shaft for angular movement with said support shaft and indicator means mounted on an outer arcuate edge of said sector-shaped plate; and
   (e) an indicator window defined in a tractor body at the top of the body portion next to the front side portion of the seat, and indicator member being positioned so that said indicator means has at least a portion thereof facing said indicator window.

2. A grass cutting height indicator according to claim 1, wherein said indicator means has graduations representing the grass cutting heights, respectively.

3. A grass cutting height indicator according to claim 1, wherein said link mechanism further comprises a sector gear having a center bearing supported by said second support shaft in fixed relation to said tractor frame, a pawl pivotably coupled to said adjusting lever and normally urged in a direction to mesh with said sector gear, and a control member mounted on said adjusting lever for releasing said pawl out of meshing engagement with said sector gear.

4. A grass cutting height indicator according to claim 3, wherein said link mechanism further comprises a third arm mounted on said first support shaft for angular movement with said first arm, and a fourth arm pivotably supported on said lawn mower unit and having a groundcontacting wheel on a lower end thereof, said fourth arm being connected with said third arm such that said fourth arm is angularly movable about said ground-contacting wheel in response to angular movement of said third arm for vertically moving said lawn mower unit.

5. A grass cutting height indicator according to claim 4, said link mechanism further comprises a pair of bell crank arms having ends operatively interconnected by a link, intermediate angular portions pivotably supported on said tractor frame, and opposite ends pivotably supported on front and rear portions, respectively, of said lawn mower unit, whereby said lawn mower unit can be kept substantially horizontal when it is vertically moved in response to angular movement of said fourth arm.

* * * * *